United States Patent
Newman et al.

(10) Patent No.: US 10,818,978 B2
(45) Date of Patent: Oct. 27, 2020

(54) BATTERY MODULE HAVING A PRESSURE SENSOR

(71) Applicant: NIO USA, Inc., San Jose, CA (US)

(72) Inventors: Austin Lawrence Newman, San Jose, CA (US); Yadunandana Yellambalase, Mountain View, CA (US)

(73) Assignee: NIO USA, Inc., San Jose, CA (US)

( * ) Notice: Subject to any disclaimer, the term of this patent is extended or adjusted under 35 U.S.C. 154(b) by 1006 days.

(21) Appl. No.: 15/284,606

(22) Filed: Oct. 4, 2016

(65) Prior Publication Data

US 2017/0331157 A1 Nov. 16, 2017

Related U.S. Application Data

(60) Provisional application No. 62/335,804, filed on May 13, 2016.

(51) Int. Cl.
| | | |
|---|---|---|
| *H01M 10/42* | (2006.01) | |
| *H01M 2/10* | (2006.01) | |
| *H01M 10/48* | (2006.01) | |

(52) U.S. Cl.
CPC ....... *H01M 10/425* (2013.01); *H01M 2/1077* (2013.01); *H01M 10/48* (2013.01); *H01M 2200/20* (2013.01); *H01M 2220/20* (2013.01)

(58) Field of Classification Search
CPC .. H01M 10/425; H01M 2/1077; H01M 10/48; H01M 2200/20; H01M 2220/20
See application file for complete search history.

(56) References Cited

U.S. PATENT DOCUMENTS

| | | | |
|---|---|---|---|
| 2001/0016278 A1 | 8/2001 | Onishi et al. | |
| 2013/0093383 A1* | 4/2013 | Kim | H02J 7/0026 |
| | | | 320/107 |
| 2013/0105264 A1 | 5/2013 | Ruth et al. | |
| 2013/0154841 A1 | 6/2013 | Kucera et al. | |
| 2014/0002269 A1* | 1/2014 | Zhou | H01M 10/482 |
| | | | 340/636.11 |
| 2014/0174150 A1 | 6/2014 | Yajima | |

(Continued)

FOREIGN PATENT DOCUMENTS

KR 201648755 C 1/2015

OTHER PUBLICATIONS

Official Action for U.S. Appl. No. 15/664,761, dated Oct, 9, 2019 7 pages.

(Continued)

*Primary Examiner* — Sujoy K Kundu
*Assistant Examiner* — L. Anderson
(74) *Attorney, Agent, or Firm* — Sheridan Ross P.C.

(57) ABSTRACT

A battery module for a vehicle is disclosed. The battery module includes a plurality of adjacent battery cells in a module housing, each battery cell including a battery case. The battery module further includes a pressure sensor on one of the battery cells or the module housing. The pressure sensor is configured to produce a signal indicative of a change in pressure associated with any of the battery cells. The battery module further includes an electronic control unit electronically connected to the pressure sensor. The electronic control unit is configured to determine the existence of an abnormal condition based on the signal.

20 Claims, 4 Drawing Sheets

(56) References Cited

U.S. PATENT DOCUMENTS

2015/0311571 A1* 10/2015 Krauss ............. H01M 10/0431
429/61
2016/0233482 A1 8/2016 Bosch et al.

OTHER PUBLICATIONS

"Leak testing in the automotive industry," INFICON, 2014, retrieved from https://products.inficon.com/getattachment.axd/?attaName=Leak-Testing-in-the-Automotive-Industry-2014, 6 pages.
U.S. Appl. No. 15/664,761, filed Jul. 31, 2017, Ing et al.
Final Action for U.S. Appl. No. 15/664,761, dated Jan. 17, 2020 7 pages.

* cited by examiner

BATTERY MODULE HAVING A PRESSURE SENSOR

PRIORITY CLAIM

This application claims priority under 35 U.S.C. § 119 to U.S. Provisional Application No. 62/335,804, filed on May 13, 2016 which is expressly incorporated by reference herein in its entirety.

FIELD OF INVENTION

The present invention relates to a battery module, and, more particularly, to a battery module having a pressure sensor.

BACKGROUND

Many electric vehicles rely on battery cells bundled into one or more battery modules to power the vehicle. It is known that the battery cells each build up temperature and pressure inside their battery case during use. As long as the temperature and pressure-build up remains within a tolerable range, the battery cells can continue to operate. If a malfunction or other abnormality occurs, however, the battery cell may overheat and over-pressurize until a safety valve is opened and/or the battery cell ruptures. In a battery module environment, one overheating battery cell may cause thermal runaway which leads to other battery cells overheating and over-pressurizing, further causing damage to multiple cells and ultimately the vehicle.

In order to monitor the status of battery cells and/or a battery module, electric vehicle power systems may include temperature sensors to monitor temperature. A control module may analyze collected temperature data to determine whether a malfunction or abnormality exists. While temperature sensors may provide valuable data, there are drawbacks to this type of system. For example, the temperature sensor may only collect localized temperature data, which may not include the temperature of each battery cell in a module. Therefore, if conditions exist to produce thermal runaway, it may not be detected until it has already occurred and is too late to address.

The present disclosure is directed to overcoming one or more problems of the prior art.

SUMMARY

In one aspect, the present disclosure is directed to a battery module for a vehicle. The battery module includes a plurality of adjacent battery cells in a module housing, each battery cell including a battery case. The battery module further includes a pressure sensor on one of the battery cells or the module housing. The pressure sensor is configured to produce a signal indicative of a change in pressure associated with any of the battery cells. The battery module further includes an electronic control unit electronically connected to the pressure sensor. The electronic control unit is configured to determine the existence of an abnormal condition based on the signal. The abnormal condition may be representative of an abnormality or malfunction occurring in one of the battery cells. Because the abnormal condition produces a change in pressure that can be felt throughout the battery module, the pressure sensor data collected by the electronic control unit indicates the problem is occurring before it is too late to take a corrective action.

BRIEF DESCRIPTION OF THE DRAWING(S)

The foregoing Summary and the following detailed description will be better understood when read in conjunction with the appended drawings, which illustrate a preferred embodiment of the invention. In the drawings.

DETAILED DESCRIPTION OF THE PREFERRED EMBODIMENT(S)

Figure 1:
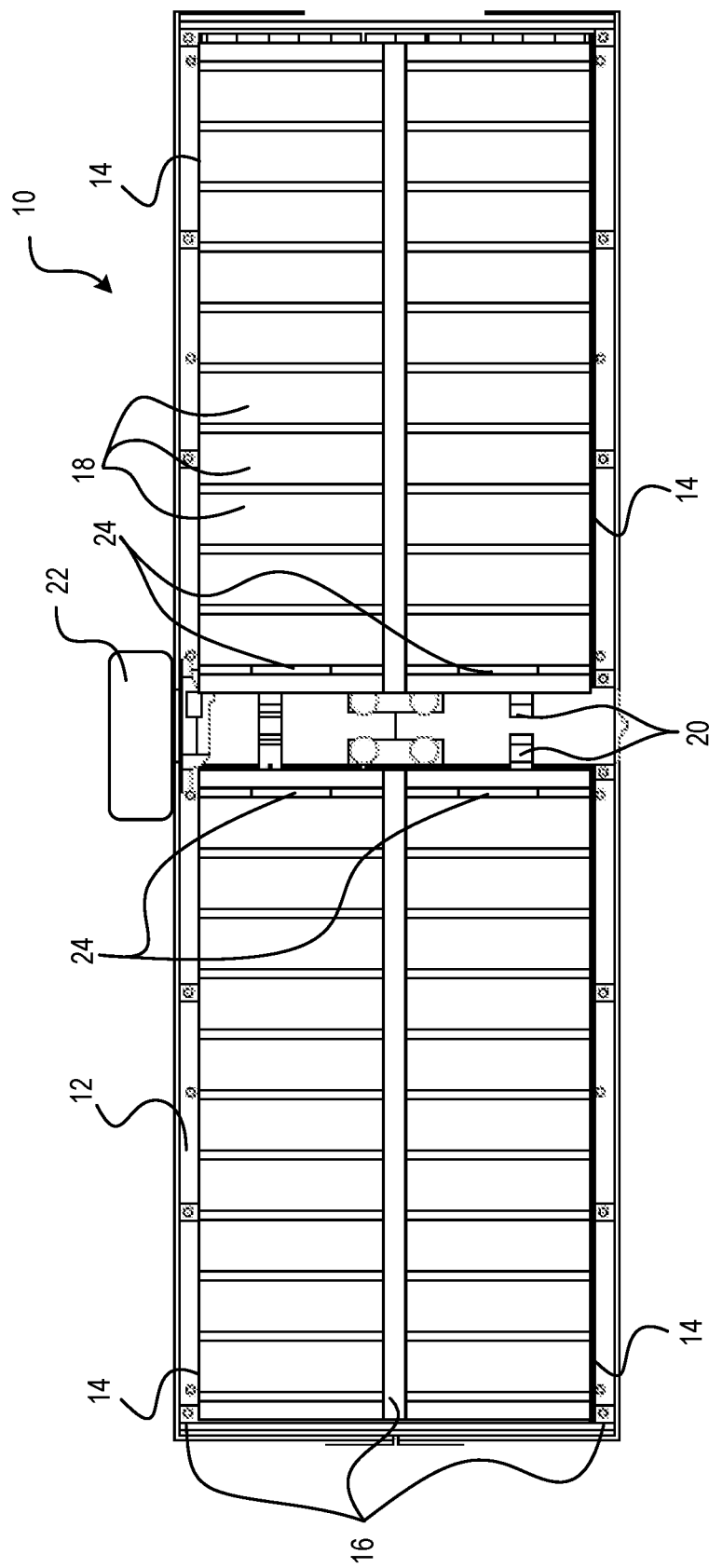
FIG. 1 is a top-view illustration of an exemplary battery pack.

FIG. 1 illustrates an exemplary battery pack 10, consistent with disclosed embodiments. The battery pack 10 may be implemented in an electric vehicle to provide electrical power to a motor of the vehicle. The battery pack 10 includes a battery pack housing 12 which encloses a plurality of battery modules 14. Each battery module 14 includes a respective module housing 16 which encloses a plurality of battery cells 18 which make up each battery module 14. Each battery cell 18 is connected (e.g., through busbars and/or wiring) to one or more terminals 20 for connecting the battery pack 10 to a vehicle electric circuit.

The battery pack 10 further includes an electronic control unit 22. The electronic control unit is configured to monitor a state of the battery cells 18. In an exemplary embodiment, each battery module 14 includes one or more sensors 24 configured to detect a parameter of a battery cell 18 in the battery module 14 and/or the battery module 14 as a whole, and produce a signal indicative of the parameter for transmission to the electronic control unit 22. In this way, the electronic control unit 22 is configured to monitor a status of each battery module 14 and/or each battery cell 18.

Figure 2:
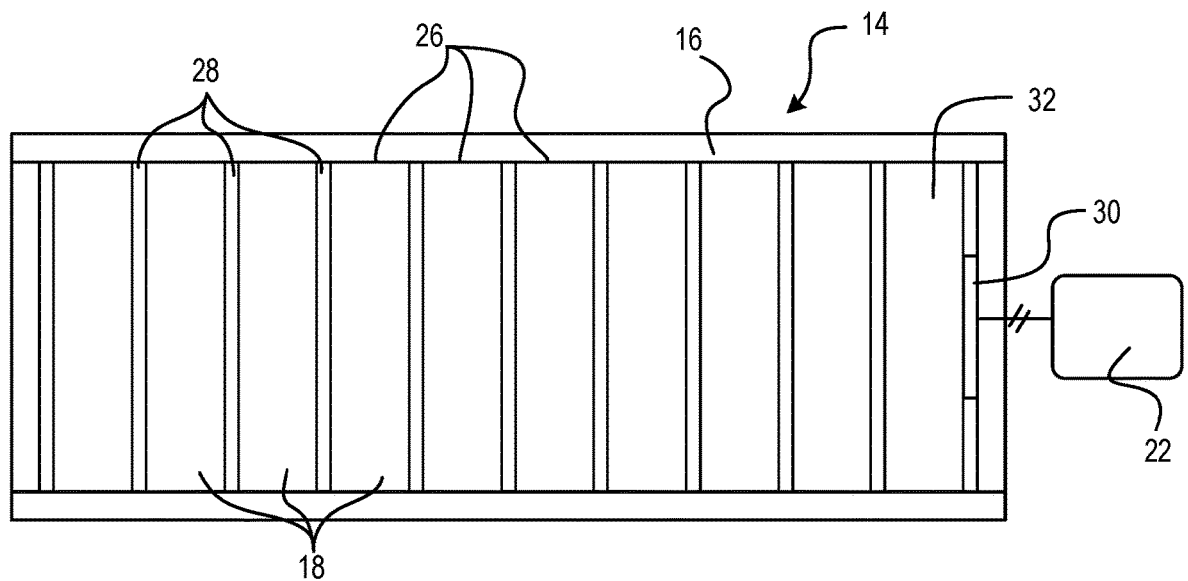
FIG. 2 is a top-view illustration of an exemplary battery module of the battery pack of FIG. 1.

FIG. 2 further illustrates one of the battery modules 14 including a plurality of the battery cells 18 in the module housing 16. In an exemplary embodiment, the battery module 14 is rectangular with a corresponding rectangular module housing 16. The module housing 16 preferably includes a least four sidewalls which form an enclosure which surrounds the battery cells 18. The module housing 16 may also include a bottom wall which supports the battery cells 18 and a top wall/lid which covers the battery cells 18 and completes an enclosed space in which the battery cells 18 are located.

Each battery cell 18 may be an electrical storage device configured to provide electrical power to an associated vehicle. Each battery cell 18 may be, for example, a replaceable battery, rechargeable battery, or the like. Each battery cell 18 may include an associated battery case 26. The battery case 26 may be generally rectangular, including parallel longer surfaces forming longitudinal sides of the battery cell 18. The battery cells 18 may be stacked with their longitudinal sides adjacent to each other in a manner known in the art. In some embodiments, a separator 28 may be interposed between the battery cells 18. The battery cells 18 may be connected in series to provide a combined electrical output as the battery module 14.

As the battery pack 10, with battery module 14, operates and provides electrical power output, a temperature and internal pressure of each battery cell 18 changes. As the pressure of each battery cell 18 changes, an expansion force acts upon the walls of the battery case 26. The pressure changes within the plurality of battery cells 18 produce forces that act on each other to provide combined forces at various locations around the battery module 14.

In an exemplary embodiment, the one or more sensors 24 shown in FIG. 1 include a pressure sensor 30. The pressure sensor 30 is configured to detect pressure forces associated with the pressurizing of one or more battery cells 18 of battery module 14. For example, the pressure sensor 30 may be positioned on a longitudinal sidewall of a selected one of the battery cases 28 of an associated battery cell 18 and configured to detect expansion forces associated therewith.

The pressure sensor 30 is electronically connected to the electronic control unit 22. The electronic control unit 22 collects the pressure sensor data. Based on the pressure sensor data from pressure sensor 30, the electronic control unit 22 may make a determination related to the health of a battery cell 18 and/or the overall battery module 14. For example, the electronic control unit 22 may compare pressure sensor data to expected data. The expected data may be based on a range of pressure values that may be present during normal operation of battery module 10. The expected data may change based on an age of the battery module 14. For example, an acceptable pressure data range may expand over time.

In some embodiments, the pressure sensor 30 may collect pressure data associated with pressure forces translating through the entire battery module 14. For example, the pressure sensor 30 may be positioned on an end battery cell 32. In another example, the pressure sensor 30 may be positioned on a wall of the module housing 16. Pressure forces associated with the battery cells 18 may be translated to and detectable at the end battery cell 32 and/or the module housing 16. In this way, if an abnormality exists and/or malfunction occurs within any battery cell 18 within the battery module 14, the abnormal forces may be translated and detected by the pressure sensor 30, allowing the electronic control unit 22 to identify the problem and notify an operator and/or perform a corrective action.

Figure 3:
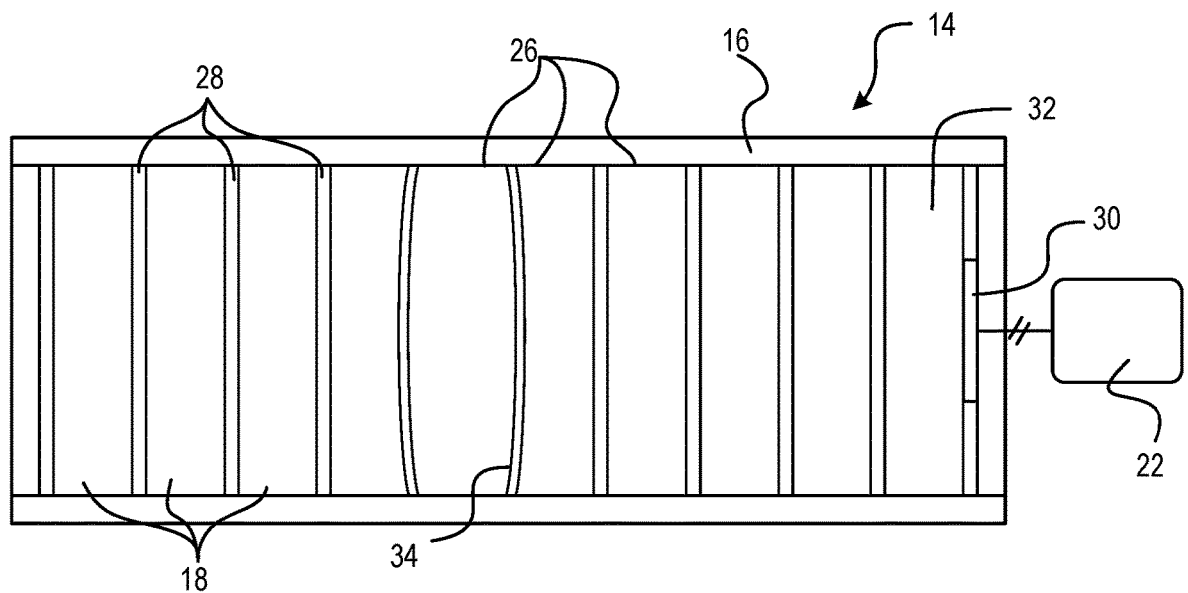
FIG. 3 is a top-view illustration of the battery module of FIG. 2, including a pressure-expanded cell.

FIG. 3 depicts an abnormality 34 in battery module 14 in which thermal runaway occurs because one battery cell 18 overheats, causing the adjacent battery cells 18 to also overheat. The overheating may cause over-pressurizing within the battery cells 18, possibly leading to damage to the battery module 14, the associated battery pack 10 and/or the associated vehicle. Consistent with disclosed embodiments, pressure sensor 30 is positioned to detect the changes in pressure in the battery cell 18 that causes thermal runaway.

Figure 4:
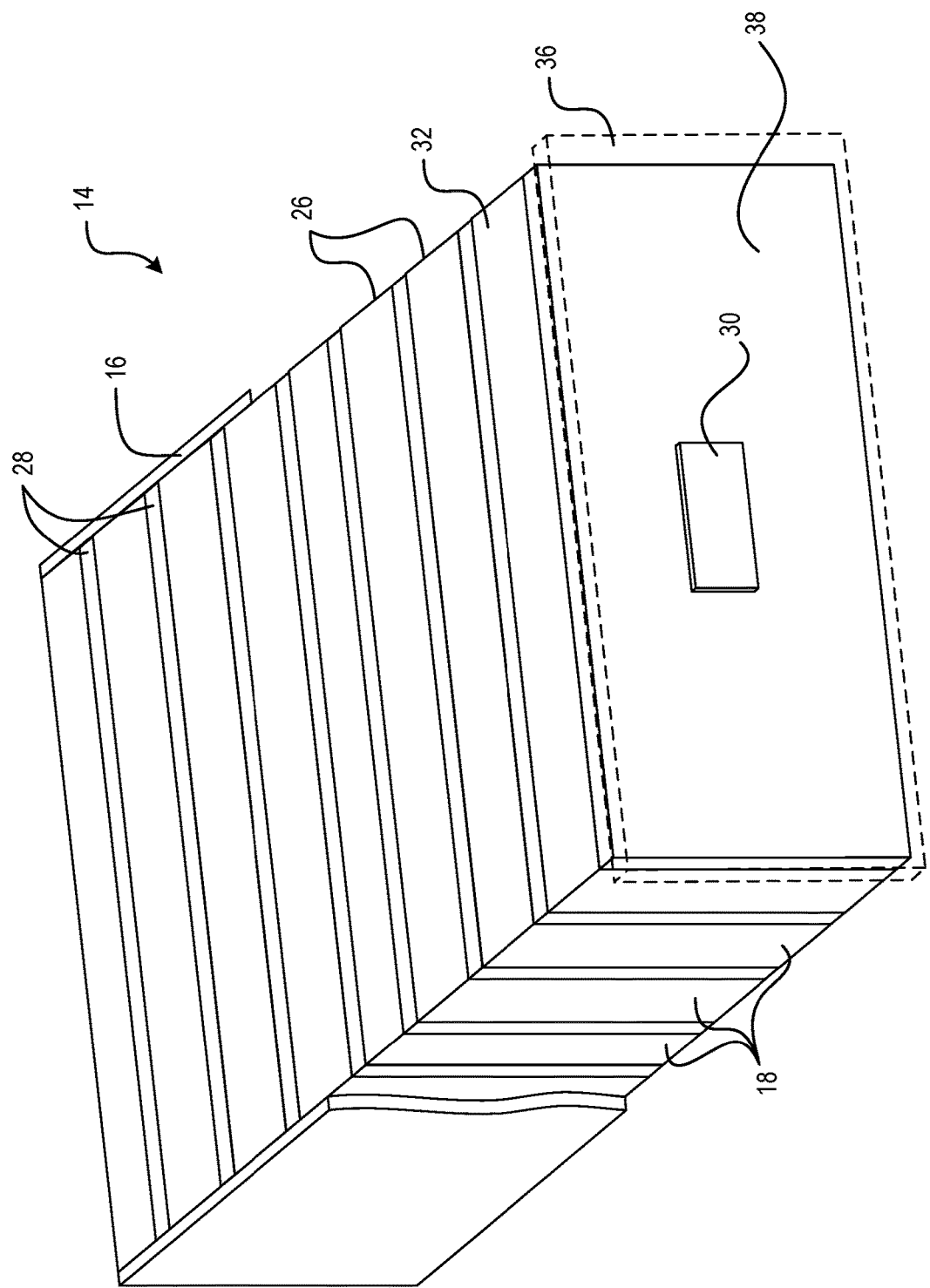
FIG. 4 is a partial cut-away perspective view of the battery module of FIG. 2, including a pressure sensor.

FIG. 4 further illustrates the battery module 14, including the pressure sensor 30 positioned between the end battery cell 32 and an end wall 36 of the module housing 16. The pressure sensor 30 may be any type of sensor capable of sensing pressure and producing a signal indicative of a pressure value, such as a strain gauge, piezoelectric element, capacitive sensor, electromagnetic sensor, or the like. Additional embodiments of the pressure sensor 30 will be described herein.

In an exemplary embodiment, the pressure sensor 30 is configured to measure a pressure value at the interface between an end surface 38 of the end battery cell 32 (or a wall of a separator 28 at that position) and the end wall 36. During normal operation of the battery module 14, each battery cell 18 may expand and/or contract within normal ranges. This causes a normal range of pressure measurable at the pressure sensor 30, which may be understood, at least in this embodiment, as the pressure sensor 30 being variably compressed between the end surface 38 and the end wall 36.

If an abnormality occurs in one of the battery cells 18, such as an abnormality which causes over-pressurization, the expansion of the battery cell 18 will cause a faster and greater overall expansion of the battery cells 18 than what would normally be expected. This expansion will be measurable at the pressure sensor 30, as the pressure sensor 30 is compressed further by the expanding battery cell 18 via the adjacent battery cells 18.

In an exemplary embodiment, the pressure sensor 30 is positioned to detect the abnormal pressurization by providing data to electronic control unit 22 which allows electronic control unit 22 to determine a rate of change of pressure forces acting at the pressure sensor 30 in the battery module 14. The rate of change of pressure may be indicative of the health of the battery module 14 because an abnormal situation (such as a malfunction that may cause thermal runaway) causes a rapid change in pressure that may be identifiable throughout the battery module 14 (i.e., including the location of the pressure sensor 30).

Rate of change of pressure may be measured and/or determined in a variety of manners. In one example, the electronic control unit 22 stores (e.g., in a memory or database) periodic pressure data and time stamp information (e.g., from a real time clock or a time received over an associated communication network). The electronic control unit 22 can use the pressure values and time between measurements to calculate a rate of change of pressure. The electronic control unit 22 can graph the pressure data over time, which may be provided to an operator for evaluation.

The electronic control unit 22 may compare the rate of change of pressure to a threshold value and determine whether the rate of change exceeds an acceptable value. Acceptable values may depend on the type of battery used and may be adjusted over time with the age of the battery. If the rate of change exceeds a relevant threshold value, the electronic control unit 22 may determine that an abnormal situation exists or a malfunction is occurring, and notify an operator and/or perform some other corrective action.

In some embodiments, the electronic control unit 22 may track pressure sensor data over time. The pressure sensor data that is tracked over time is indicative of information relative to the battery pack 10, battery module 14, and/or battery cells 18. As mentioned herein, the internal pressure relative to an individual battery cell 18 (and thus an associated battery module 14) and the rate of change of the internal pressure changes over time as the battery module 14 and battery cells 18 age. Tracking of the pressure data can then be used to identify information and parameters relative to a battery cell and/or module age, remaining lifespan, and the like.

For example, pressure sensor data may be used to determine and/or predict a number of remaining cycles a battery cell 18 can be charged, and/or identify a state of charge of a battery cell 18 and/or its usable energy. This may be achieved by the electronic control unit 22 analyzing pressure data (e.g., rate of change or pressure), comparing the pressure data to known or expected parameters (e.g., empirical data, the actual age of the battery cell, the number of cycles it has been charged, a calculated charge, etc.), and determining a parameter (e.g., expected lifetime, state of charge, usable energy) based on the comparison. In some situations, the pressure data (e.g., rate of change of pressure) can be used to evaluate a battery cell 18, battery module 14, and/or battery pack 10, such as for use in warranty or insurance coverage and claims (e.g., determining whether the battery cell has exceeded a lifespan/useful life under which warranty coverage is available).

The disclosed embodiments, in utilizing a pressure sensor 30 to detect abnormal changes in battery module pressure, provides electronic control unit 22 with data that is indicative of a health of the battery module 14. This health information may be more effective than health information associated with detected temperatures of battery module 14, because abnormal pressurization may be detected throughout the battery module 14, while abnormal temperatures may be localized until thermal runaway occurs, at which point detection may be too late for corrective action. In addition, tracking of pressure data over time provides additional information which may be used to evaluate a status of a battery pack, module, and/or cell, such as a remaining lifespan, thereby providing additional benefits to the measuring of pressure data via one or more pressure sensors.

It should be understood that other embodiments are possible. For example, the pressure sensor 30 and associated electronic control unit 22 processes may be associated with other battery systems (e.g., systems that are not associated with a vehicle). Moreover, a network of pressure sensors 30 may be applicable to a single battery module 14 and/or to a network of battery modules 14 in a battery pack 10 used to provide power to a vehicle. For example, as illustrated in FIG. 1, a network of several battery modules 14 may be connected to each other and configured to provide pressure data to the central electronic control unit 22.

In the case of a central electronic control unit 22, data from multiple pressure sensors 30 may be collected and stored. This information may be mapped to locations within the battery pack 10, such as a specific battery cell 18, a battery module 14, a portion of the battery module 14 or battery pack 10, etc. The central electronic control unit 22 may monitor the pressure data from each sensor 30 and identify an abnormal situation (e.g., an abnormal deviation in rate of change of pressure) from one of the sensors 30 (or more). The central electronic control unit 22 may identify which pressure sensor 30 is reporting the abnormal data and use this information to diagnose a problem in the battery pack 10 and provide a corrective action. For example, the central electronic control unit 22 may determine that a particular battery cell 18 in a particular battery module 14 is overpressurized and perform an action to remedy the situation (e.g., warn an operator, electrically disconnect the battery cell 18 and/or battery module 14, cool the battery cells 18, etc.).

Figure 5:
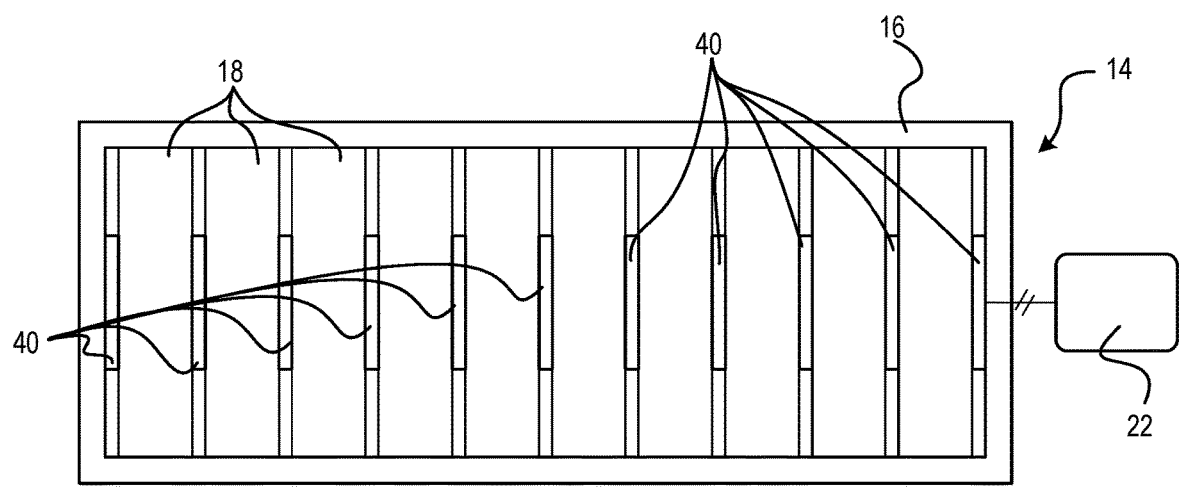
FIGS. 5-7 are additional top-view illustrations of a battery module including alternative pressure sensor configurations.

FIG. 5 illustrates one such alternative embodiment of a sensor configuration for a battery module 14. In this embodiment, the battery module 14 includes a plurality of health sensors 40. For example, the battery module 14 may include a health sensor 40 for each battery cell 18.

The health sensor 40 may be configured to measure a parameter associated with a respective battery cell 18 and provide a signal indicative of the parameter to the electronic control unit 22. The measurable parameters of the health sensor 40 include at least a pressure associated with the respective battery cell 18. For example, the health sensor 40 may be positioned between a battery case wall of a respective battery cell 18 and an adjacent wall (e.g., or an adjacent battery cell 18, an adjacent separator 28, or a wall of the module housing 16) and/or may be built into the battery cell 18. In some embodiments, the health sensor 40 may be configured to measure additional parameters, such as tension, temperature, etc.

Each health sensor 40 is electronically connected to the electronic control unit 22 and configured to provide a signal indicative of a parameter (e.g., pressure, strain, temperature, etc.) to the electronic control unit 22. In this way, the electronic control unit is capable of monitoring each individual battery cell 18 and identifying any potential issues, such as an abnormality that causes over-pressurization, overheating, etc. The electronic control unit 22 may identify a particular battery cell 18 which needs to be replaced based on the health information received from the health sensors 40.

Figure 6:
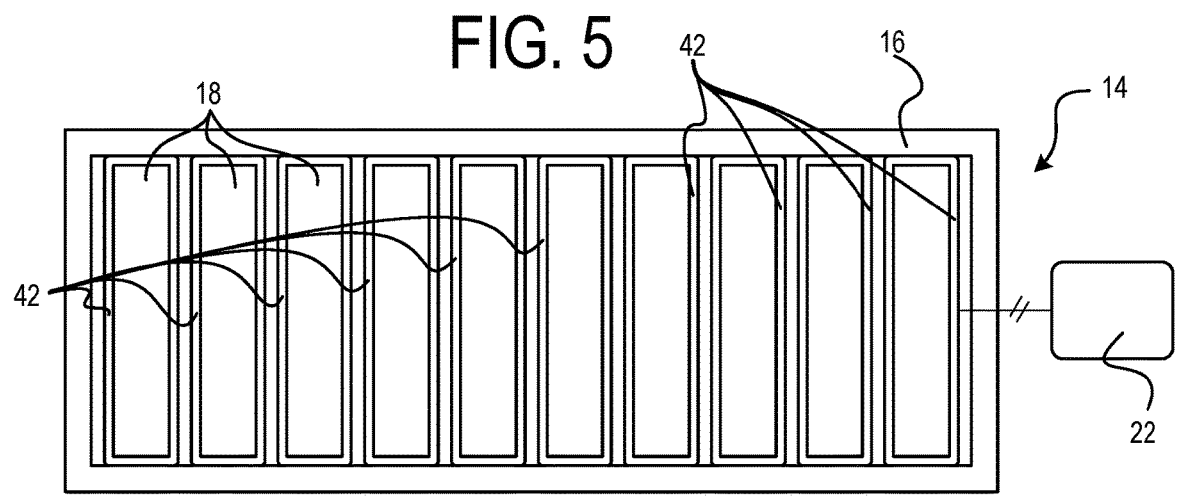

FIG. 6 further illustrates another alternative sensor configuration. In this embodiment, the battery module 14 includes one or more pressure sensors 42. In an exemplary embodiment, the pressure sensor 42 is an expandable and/or elastic sleeve which surrounds an associated battery module 16. The pressure sensor 42 is configured to be compressed and/or expand to fill a space between adjacent battery cells 18 (or a space between a battery cell 18 and an adjacent separator), as well as a space between end walls of the battery case 28 and the module housing 16.

The pressure sensor 42 is configured to provide a signal to the electronic control unit 22 indicative of a change in pressure. Because the pressure sensor 42 surrounds the battery cell 18, the pressure sensor 42 is able to detect expansion in any direction. In this way, if an abnormality causes a pressure gradient (e.g., between an end wall of a battery cell 18 and the module housing 16, only in an upper portion or lower portion of a cell, etc.) where an abnormal pressure change is only present in some locations, the pressure sensor 42 is able to detect the change.

While FIG. 6 illustrates a pressure sensor 42 surrounding each battery cell 18, it should be understood that any number of the battery cells 18 may include the pressure sensor 42 (e.g., one or more). For example, one or more battery cells 18 near a center of the batter module 14 may include the pressure sensor 42 such that pressure changes on opposing ends of the battery module will be a short distance from the pressure sensor 42 and more easily identified.

Figure 7:
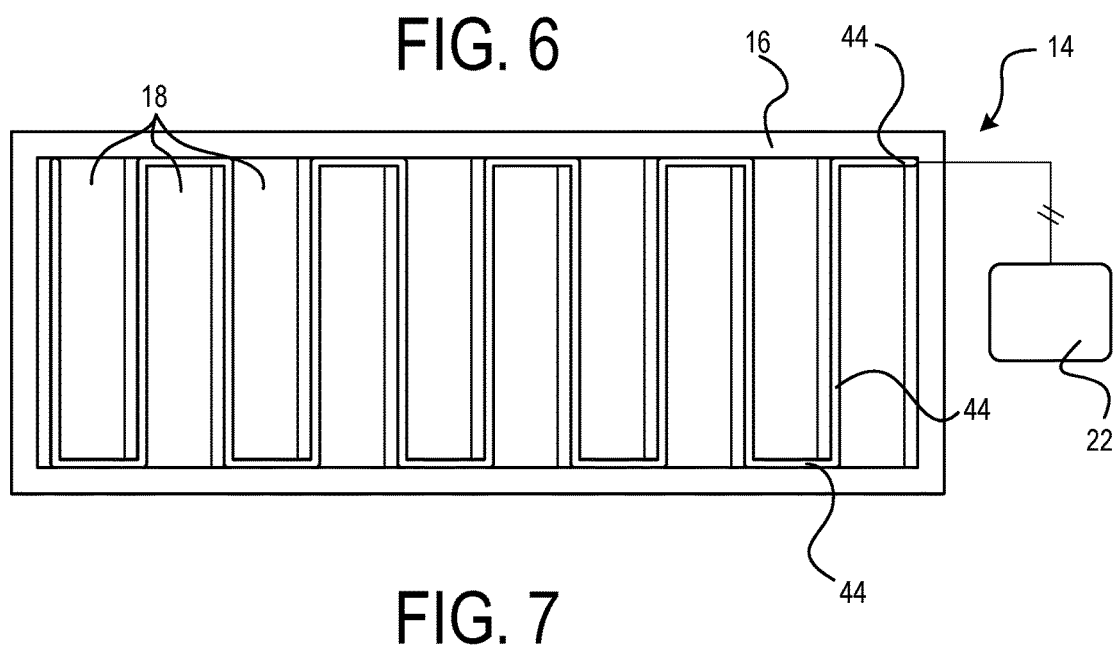

FIG. 7 illustrates another embodiment, similar to the embodiment of FIG. 6, in which the battery module 14 includes one or more pressure sensors 44. The pressure sensors 44 are similar to the pressure sensors 42 in that they may be expandable and/or elastic such that they fill spaces between an associated battery cell 18 and an adjacent surface (e.g., of a battery cell 18, separator 28, or module housing 16). The pressure sensor 44 may be configured as a linear sensor which zig-zags around one or more sides of a battery cell 18 and/or a plurality of battery cells 18. In this way at least one longitudinal side 46 and at least one transverse side 48 of at least battery cell 18 includes a portion of the pressure sensor 44 adjacent thereto. This allows for pressure measurements in two directions (e.g., longitudinal and transverse).

In the embodiment of FIG. 7, the pressure sensor 44 zig-zags around a plurality of battery cells 18. In this way, the pressure sensor 44 can measure pressure data in the longitudinal and transverse direction and associate any abnormal changes in pressure with a particular battery cell 18. It should be understood that the pressure sensor 44 may be formed form one sensor or may include a plurality of sensors and may be implemented in a portion or throughout the battery module 14.

Having thus described the presently preferred embodiments in detail, it is to be appreciated and will be apparent to those skilled in the art that many physical changes, only a few of which are exemplified in the detailed description of the invention, could be made without altering the inventive concepts and principles embodied therein. It is also to be appreciated that numerous embodiments incorporating only part of the preferred embodiment are possible which do not alter, with respect to those parts, the inventive concepts and principles embodied therein. The present embodiments and optional configurations are therefore to be considered in all respects as exemplary and/or illustrative and not restrictive, the scope of the invention being indicated by the appended claims rather than by the foregoing description, and all alternate embodiments and changes to this embodiment which come within the meaning and range of equivalency of said claims are therefore to be embraced therein.

What is claimed is:

1. A battery module for a vehicle, comprising:
   a module housing comprising:
      a first pair of sidewalls running a length of the battery module, the first pair of sidewalls offset from one another by a width of the battery module; and
      a second pair of sidewalls running the width of the battery module and offset from one another by the length of the battery module, wherein a space between the first pair of sidewalls and the second pair of sidewalls defines an enclosed space of the module housing;
   a plurality of battery cells arranged adjacent to one another inside the enclosed space of the module housing, each battery cell of the plurality of battery cells comprising a battery case forming a longitudinal side and a transverse side of each battery cell;
   a pressure sensor disposed inside the enclosed space of the module housing between one sidewall of the second pair of sidewalls and the longitudinal side of one battery cell of the plurality of battery cells that is immediately adjacent to the one sidewall of the second pair of sidewalls and wherein the pressure sensor is disposed inside the enclosed space of the module housing between one sidewall of the first pair of sidewalls and the transverse side of the one battery cell, the pressure sensor configured to produce a signal indicative of a change in pressure associated with one or more of the plurality of battery cells; and
   an electronic control unit electronically connected to the pressure sensor, the electronic control unit configured to determine the existence of an abnormal condition based on the signal.

2. The battery module of claim 1, wherein the signal comprises a pressure value and the electronic control unit compares the pressure value to a threshold value to determine the existence of the abnormal condition.

3. The battery module of claim 2, wherein the pressure value is a rate of change of pressure in the enclosed space over time.

4. The battery module of claim 3, wherein the electronic control unit is configured to determine the threshold value based on an age associated with the battery module.

5. The battery module of claim 1, wherein the pressure sensor is positioned between each battery cell of the plurality of battery cells.

6. The battery module according to claim 5, wherein the pressure sensor is a strain gauge.

7. The battery module according to claim 1, wherein the pressure sensor is positioned between an other one sidewall of the second pair of sidewalls and the longitudinal side of an other one batter cell of the plurality of battery cells.

8. The battery module according to claim 7, wherein the pressure sensor is a strain gauge.

9. The battery module according to claim 1, wherein the pressure sensor is configured to measure a change in pressure in a longitudinal direction of the one battery cell from a point between the one sidewall of the first pair of sidewalls and the transverse side of the one battery cell and measure a change in pressure in a transverse direction of the one battery cell from a point between the one sidewall of the second pair of sidewalls and the longitudinal side of one battery cell.

10. The battery module according to claim 9, wherein the pressure sensor is a sleeve which surrounds the one battery cell on four sides.

11. The battery module according to claim 1, wherein the pressure sensor extends continuously along a castellated path inside the enclosed space of the module housing running from the longitudinal side of the one battery cell to the transverse side of the one battery cell then to the longitudinal side of a next battery cell in the plurality of battery cells that is immediately adjacent to the longitudinal side of the one battery cell then to the transverse side of the next battery cell at a point between an other one sidewall of the first pair of sidewalls opposite the one sidewall of the first pair of sidewalls.

12. A battery module for a vehicle, comprising:
   a module housing comprising:
      a first pair of sidewalls running a length of the battery module, the first pair of sidewalls offset from one another by a width of the battery module; and
      a second pair of sidewalls running the width of the battery module and offset from one another by the length of the battery module, wherein a space between the first pair of sidewalls and the second pair of sidewalls defines an enclosed space of the module housing,
   a plurality of battery cells arranged adjacent to one another inside the enclosed space of the module housing, each battery cell of the plurality of battery cells comprising a battery case forming a longitudinal side and a transverse side of each battery cell;
   a plurality of pressure sensors disposed inside the enclosed space of the module housing, wherein the plurality of pressure sensors comprise a first pressure sensor and a second pressure sensor associated with each battery cell of the plurality of battery cells, wherein the first pressure sensor is disposed on the longitudinal side of each battery cell, wherein the second pressure sensor is disposed on the transverse side of each battery cell, and wherein the first pressure sensor and the second sensor associated with each battery cell are configured to produce signals indicative of a change in pressure associated with each battery cell, respectively; and
   an electronic control unit electronically connected to the plurality of pressure sensors, the electronic control unit configured to determine the existence of an abnormal condition based on the signals.

13. The battery module of claim 12, wherein the electronic control unit is configured to identify a particular battery cell of the plurality of battery cells causing the abnormal condition based on the signals received from the plurality of pressure sensors.

14. The battery module of claim 12, wherein the signals comprise a pressure value and the electronic control unit is configured to compare the pressure value to a threshold value to determine the existence of the abnormal condition.

15. The battery module of claim 14, wherein the pressure value is a rate of change of pressure measured by the plurality of pressure sensors over time.

16. The battery module of claim 15, wherein the electronic control unit is configured to determine the threshold value based on an age associated with the battery module.

17. The battery module according to claim 12, wherein the plurality of pressure sensors are configured to measure a change in pressure in a longitudinal direction of each battery cell from a point between at least one sidewall of the first pair of sidewalls and the transverse side of each battery cell and measure a change in pressure in a transverse direction of each battery cell from a point between longitudinal sides of immediately adjacent battery cells in the plurality of battery cells.

18. The battery module according to claim 17, wherein the plurality of pressure sensors are surround each battery cell.

19. The battery module according to claim 17, wherein the plurality of pressure sensors are distributed along a castellated path inside the enclosed space of the module and surrounding at least two sides of each batters cell.

20. A battery pack for an electric vehicle, the battery pack comprising:
- a plurality of battery modules, each battery module of the plurality of battery modules comprising:
  - a module housing comprising:
    - a list pair of sidewalls running a length of the battery module, the first pair of sidewalls offset from one another by a width of the battery module; and
    - a second pair of sidewalls running the width of the battery module and offset front one another by the length of the battery module, wherein a space between the first pair of sidewalls and the second pair of sidewalls defines an enclosed space of the module housing:
  - a plurality of battery cells arranged adjacent to one another inside the enclosed space of the module housing, each battery cell of the plurality of battery cells comprising a battery case forming a longitudinal side and a transverse side of each battery cell; and
- a pressure sensor disposed inside the enclosed space of the module housing between one sidewall of the second pair of sidewalls and the longitudinal side of one battery cell of the plurality of battery cells that is immediately adjacent to the one sidewall of the second pair of sidewalls and wherein the pressure sensor is disposed inside the enclosed space of the module housing between one sidewall of the first pair of sidewalls and the transverse side of the one battery cell, the pressure sensor configured to produce a signal indicative of a rate of change in pressure associated with one or more of the plurality of battery cells; and
- an electronic control unit electronically connected to the pressure sensor of each battery module, the electronic control unit configured to determine the existence of an abnormal condition based on the signal by comparing the rate of change in pressure to a threshold rate of change in pressure.

* * * * *

UNITED STATES PATENT AND TRADEMARK OFFICE
CERTIFICATE OF CORRECTION

PATENT NO. : 10,818,978 B2
APPLICATION NO. : 15/284606
DATED : October 27, 2020
INVENTOR(S) : Austin Lawrence Newman et al.

Page 1 of 1

It is certified that error appears in the above-identified patent and that said Letters Patent is hereby corrected as shown below:

In the Claims

Claim 7, Column 7, Line 65, replace "batter" with --battery-- therein.
Claim 12, Column 8, Line 36, replace the "," with a --;-- therein.
Claim 19, Column 9, Line 21, replace "batters" with --battery-- therein.
Claim 20, Column 9, Line 27, replace "list" with --first-- therein.
Claim 20, Column 9, Line 31, replace "front" with --from-- therein.
Claim 20, Column 10, Line 4, replace the ":" with a --;-- therein.

Signed and Sealed this
Fifth Day of January, 2021

Andrei Iancu
*Director of the United States Patent and Trademark Office*